United States Patent
Strand

(10) Patent No.: US 9,613,360 B1
(45) Date of Patent: Apr. 4, 2017

(54) OFFERING COMPLEMENTARY PRODUCTS IN AN ELECTRONIC COMMERCE SYSTEM

(75) Inventor: William Alexander Strand, Issaquah, WA (US)

(73) Assignee: Amazon Technologies, Inc., Seattle, WA (US)

( * ) Notice: Subject to any disclaimer, the term of this patent is extended or adjusted under 35 U.S.C. 154(b) by 1155 days.

(21) Appl. No.: 12/788,582

(22) Filed: May 27, 2010

(51) Int. Cl.
*G06Q 30/00* (2012.01)
*G06Q 30/02* (2012.01)

(52) U.S. Cl.
CPC ......... *G06Q 30/02* (2013.01); *G06Q 30/0241* (2013.01)

(58) Field of Classification Search
CPC ...................... G06Q 30/0207; G06Q 30/0251
USPC .......................................................... 705/14
See application file for complete search history.

(56) References Cited

U.S. PATENT DOCUMENTS

| | | | |
|---|---|---|---|
| 8,392,281 B1* | 3/2013 | Bashir et al. ................ 705/26.7 |
| 2002/0007322 A1* | 1/2002 | Stromberg ....................... 705/26 |
| 2002/0032620 A1* | 3/2002 | Benz et al. ...................... 705/27 |
| 2002/0077906 A1* | 6/2002 | Remler ................. G06Q 30/02 |
| | | | 705/14.49 |
| 2002/0169686 A1* | 11/2002 | Zweben et al. ................. 705/26 |
| 2003/0004798 A1* | 1/2003 | McAuliffe et al. ............. 705/14 |
| 2005/0028153 A1* | 2/2005 | Anderson ...................... 717/168 |
| 2005/0060182 A1* | 3/2005 | Nagelvoort ....................... 705/1 |
| 2005/0149391 A1* | 7/2005 | O'Shea ................ G06Q 10/087 |
| | | | 705/14.38 |
| 2007/0078850 A1* | 4/2007 | Aziz et al. ......................... 707/6 |
| 2008/0046332 A1* | 2/2008 | Rotholtz ................ G06Q 10/02 |
| | | | 705/5 |
| 2008/0133305 A1* | 6/2008 | Yates et al. ....................... 705/8 |
| 2008/0221992 A1* | 9/2008 | Bernstein ........................ 705/14 |
| 2008/0277168 A1* | 11/2008 | Doerwald .......... G01G 19/4144 |
| | | | 177/25.15 |
| 2008/0288855 A1* | 11/2008 | Issler et al. .................... 715/205 |
| 2009/0210319 A1* | 8/2009 | Rohatgi et al. ................. 705/27 |
| 2010/0121708 A1* | 5/2010 | Schultz ....................... 705/14.49 |
| 2011/0071897 A1* | 3/2011 | Kniaz et al. ................ 705/14.42 |
| 2012/0123864 A1* | 5/2012 | Mueller et al. ............ 705/14.53 |
| 2012/0259687 A1* | 10/2012 | Kajamohideen et al. . 705/14.23 |
| 2016/0071187 A1* | 3/2016 | Bhosle ............... G06Q 30/0631 |
| | | | 705/26.7 |

\* cited by examiner

*Primary Examiner* — Matthew L Hamilton
(74) *Attorney, Agent, or Firm* — Thomas | Horstemeyer, LLP

(57) ABSTRACT

Disclosed are various embodiments for offering complementary products in relation to items listed by third party sellers in an electronic marketplace. Embodiments herein identify items available for sale by third parties in an electronic marketplace. An offer to include a complementary item available from an electronic commerce system in the electronic marketplace listing is transmitted to the third party seller. In other embodiments, a sale of an item in an electronic marketplace is detected and an offer to sell the product from the electronic commerce system is transmitted to the buyer.

20 Claims, 5 Drawing Sheets

OFFERING COMPLEMENTARY PRODUCTS IN AN ELECTRONIC COMMERCE SYSTEM

BACKGROUND

In an electronic marketplace, a third party seller, which is often an individual, can attempt to engage buyers to sell one or more items. A third party seller, however, often does not have the ability to include additional accessory items or complementary products that can be offered by a merchant. Accordingly, buyers may seek to purchase the item from a merchant, who can offer discounted bundles, etc., which include accessory items or complementary products or other means to incentivize a buyer to purchase the item, whereas third party sellers in an electronic marketplace may not have access to means to incentivize a potential buyer in this way.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

Embodiments of the present disclosure disclose various systems and methods that facilitate offering and selling of complementary products in an electronic commerce system that are related to a third party transaction for an item in an electronic marketplace. As discussed herein, a third party transaction is one that occurs in an electronic marketplace between a third party seller (e.g., a seller other than an operator of the electronic commerce system) and a buyer of the item. Complementary products can be those that are related to the item involved in the third party transaction, or products that complement the item. As a non-limiting example, if the item involved in the third party transaction is a mobile device, a complementary product can include a carrying case for the mobile device. As another example, if the item involved in the third party transaction is a car, the complementary product can include floor mats made for the specific car. Other examples should be appreciated by a person of ordinary skill in the art.

Figure 1:
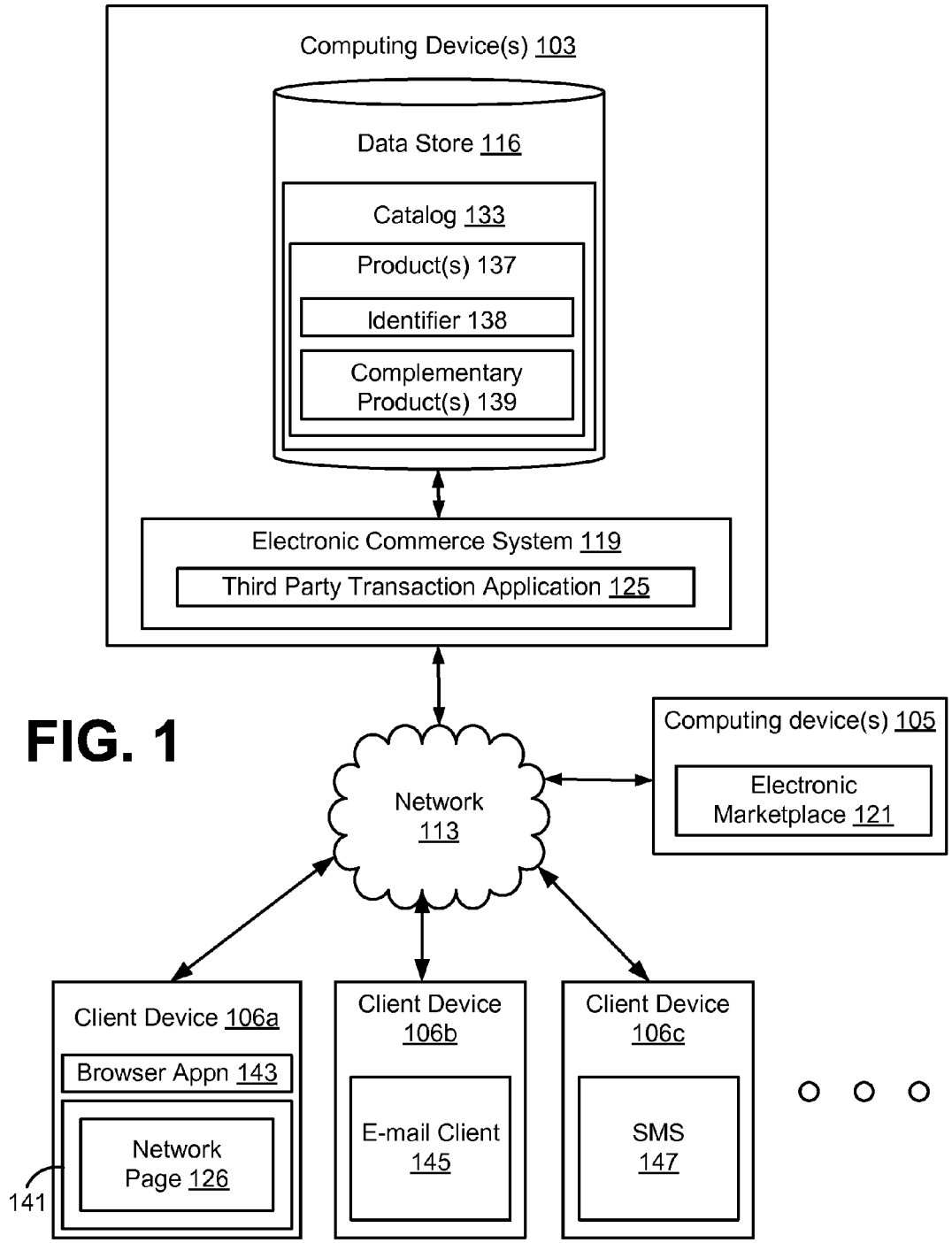
FIG. 1 is a drawing of networked environment according to various embodiments of the present disclosure.

With reference to FIG. 1, shown is a networked environment 100 according to various embodiments. The networked environment 100 includes one or more computing devices 103, 105 and one or more client devices 106 coupled to a network 113. The network 113 includes, for example, the Internet, intranets, extranets, wide area networks (WANs), local area networks (LANs), wired networks, wireless networks, or other suitable networks, etc., or any combination of two or more such networks.

The computing device(s) 103 may comprise, for example, a server computer or any other system providing computing capability. Alternatively, a plurality of computing devices 103 may be employed that are arranged, for example, in one or more server banks or computer banks or other arrangements. For example, a plurality of computing devices 103 together may comprise, for example, a cloud computing resource, a grid computing resource, and/or any other distributed computing arrangement. Such computing devices 103 may be located in a single installation or may be dispersed among many different geographical locations. In one embodiment, the computing device 103 represents a virtualized computer system executing on one or more physical computing systems. For purposes of convenience, the computing device 103 is referred to herein in the singular. Even though the computing device 103 is referred to in the singular, it is understood that a plurality of computing devices 103 may be employed in the various arrangements as described above.

Various applications and/or other functionality may be executed in the computing device 103 according to various embodiments. Also, various data is stored in a data store 116 that is accessible to the computing device 103. The data store 116 may be representative of a plurality of data stores as can be appreciated. The data stored in the data store 116, for example, is associated with the operation of the various applications and/or functional entities described below. In one embodiment, the data store 116 can be implemented in one computing device 103, and the other elements depicted can be implemented in other computing devices 103 as can be appreciated.

The components executed on the computing device 103 include, for example, an electronic commerce system 119 and other systems, applications, services, processes, engines, or functionality not discussed in detail herein. In the depicted networked environment, the computing device 105 implements an electronic marketplace 121, which can include a system facilitating the exchange of goods and/or services between third party sellers and buyers, and is further described herein. The electronic commerce system 119 is executed in order to facilitate the online viewing and/or purchase of items and products over the network 113. Embodiments of this disclosure also locate items available in an electronic marketplace and offer complementary products available via the electronic commerce system 119 to third party sellers and buyers involved in a transaction.

The electronic commerce system 119 also performs various backend functions associated with the online presence of a merchant in order to facilitate the online purchase of items as will be described. For example, the electronic commerce system 119 generates network pages 126, such as web pages or other types of network content that are provided to client devices 106 in response to requests for the purposes of selecting items for purchase, rental, download, lease, or other form of consumption and to perform other tasks as will be described. Among other applications, the electronic commerce system 119 includes a third party transaction application 125 executed to facilitate the functionality that will be further described herein.

The data stored in the data store 116 includes, for example, a catalog 133 that contains a listing of various products 137 that are available for browsing and/or purchasing within the electronic commerce system 119. In addition, the products 137 available within the electronic commerce system 119 can be associated with an identifier 138 that can uniquely identify a product within the catalog 133. As a non-limiting example, the identifier 138 can include a serial number, a stock keeping unit (SKU), or other identifier 138 as can be appreciated.

The products 137 in the catalog 133 of the data store 116 can also include entries that identify complementary products 139 that are available in the electronic commerce system 119. The complementary products 139 can include products that are bought as accessories or in tandem with a give product 137. As a non-limiting example, accessories for a particular product 137 can be identified as complementary products 139 in the data store 116. In addition, products 137 can be listed as a complementary product 139 for another product 137 even if they are not accessories or related in the sense that they are used together, but if they are often purchased together or have some association with one another, they can be linked together. As a non-limiting example, if a product 137 is a specific car, a complementary product 139 can include a movie about cars. In this example, a movie about cars may not be an accessory product for the car, and may have little or no utility in conjunction with the car, but still has some relation to the car or a product category in which the car is classified.

The client device 106 is representative of a plurality of client devices 106 that may be coupled to the network 113. The client device 106 may comprise, for example, a processor-based system such as a computer system. Such a computer system may be embodied in the form of a desktop computer, a laptop computer, a personal digital assistant, a mobile device (e.g. cellular telephone, smart phone, etc.), set-top box, music players, web pads, tablet computer systems, or other devices with like capability. The client device 106 includes a display device 141 upon which various network pages 126 and other content may be rendered.

The client device 106a may be configured to execute various applications such as a browser application 143 and/or other applications. The browser application 143 may be executed in a client device 106a, for example, to access and render network pages 126, such as web pages, or other network content served up by the computing device 103 and/or other servers. The client device 106b may be configured to execute applications beyond browser application 143 such as, for example, an email client 145 for receiving email generated by the electronic commerce system 119, instant message applications, and/or other applications. In the case of a client device 106c that implements mobile phone standards, the client device 106c can also execute a short message service (SMS) client 106c for receiving SMS messages generated by the electronic commerce system 119.

Next, a general description that provides one example of the operation of the various components of the networked environment 100 is provided. As noted above, third party sellers and buyers can engage in transactions for items in an electronic marketplace 121. A computing device 105 can implemented various types of electronic marketplaces 121, which can include, but is not limited to, an electronic auction site, an electronic classified site, a brokering site, etc. In other words, any site or system configured to bring third party sellers and buyers together and/or facilitate a transaction for the buying and selling of goods or services can be considered an electronic marketplace 121 in the context of this disclosure.

Accordingly, in some types of electronic marketplaces 121, a third party seller can create a listing for sale of an item. The item can include any type of product, service, and/or good. The third party transaction application 125 can, in one embodiment, crawl the various listings of an electronic marketplace 121 and examine the various products and services offered for sale by third party sellers. Upon identifying an item offered for sale by a third party seller, the third party transaction application 125 executed by the electronic commerce system 119 can determine whether the item is available as a product 137 within the electronic commerce system 119.

The third party transaction application 125 can identify and determine whether items that are the subject of a third party transaction are available within the catalog 133 of the electronic commerce system 119 by determining whether an identifier 138 appears in the listing of an item in the electronic marketplace 121. As a non-limiting example, if a third party seller is attempting to sell a book in an electronic marketplace 121, the third party transaction application 125 can determine whether the book is available via the electronic commerce system 119 by extracting an International Standard Book Number (ISBN), SKU, serial number, etc., that is listed as an identifier 138 associated with a product 137 in the catalog 133.

As an alternative non-limiting example, if a third party seller is attempting to sell a car in the electronic marketplace 121, the third party transaction application 125 can extract a model name from the text of the listing in the electronic marketplace 121, and determine whether the model name of the car is stored associated with a product 137 in the catalog 133. In this example, the third party transaction application 125 can also determine a brand, model name or model number from a serial number of the car. However, when locating whether the car is available as a product 137 in the catalog 133, the third party transaction application 125 can search for other cars having the same or similar brand name, model name and/or model number rather than the same serial number.

Other examples should be appreciated by a person of ordinary skill in the art. Accordingly, if the item in the listing in the electronic marketplace 121 is located as a product 137 available in the catalog 133, the third party transaction application 125 can locate one or more complementary products 139 available in the electronic commerce system 119 that are associated with the product 137. In the example of a car that is an item in a listing in the electronic marketplace 121, the third party transaction application 125 can locate, as complementary products, floor mats, parts, user manuals, etc., that are related to the car.

In addition to determining whether the item in a listing in the electronic marketplace 121 is available in the catalog 133, and then locating complementary products 139 on this basis, the third party transaction application 125 can also locate complementary products 139 on the basis of their relevance to the item in a listing in the electronic marketplace 121. As a non-limiting example, the third party transaction application 125 can extract information about the item from a listing in the electronic marketplace 121. The third party transaction application 125 can then generate search terms from the extracted information and search the catalog 133 associated with the data store 116 for products 137 that are relevant to the search terms. As a non-limiting example, the third party transaction application 125 can extract a title of a listing in the electronic marketplace 121, and perform a relevance search across textual data stored in the catalog 133 and associated with products 137. As another non-limiting example, the third party transaction application 125 can extract a text description from the item in the electronic marketplace 121 and perform a natural language search across textual data stored in the catalog 133 and associated with products 137. Accordingly, the most relevant product 137 located in the catalog 133 can be identified as a complementary product for the item in a listing in an electronic marketplace 121.

As yet another example of locating complementary products, the third party transaction application 125 can also identify an item a listing in the electronic marketplace 121. The third party transaction application 125 can identify an item in the listing in the electronic marketplace 121 by extracting metadata or other data in the electronic marketplace 121 can is associated with the listing. As a non-limiting example, a listing in an electronic marketplace 121 may be classified in a hierarchical categorization methodology, and the third party transaction application 125 can extract data from this hierarchy in order to identify the item. As another example, the listing in the electronic marketplace 121 may be associated with an item name, serial number, or other identifier that the third party transaction application 125 can extract in order to identify the item.

Upon identifying the item in the electronic marketplace 121, the third party transaction application 125 can then determine whether the item name, serial number, or other data extracted from the electronic marketplace 121 listing is located in data associated with products 137 in the catalog 133. In one example, the third party transaction application 125 can determine whether an item name is located within metadata associated with a product 137 even though the exact item itself in the electronic marketplace 121 listing is not available in the catalog 133. One non-limiting example of such a scenario is the example of an item that is not available via the electronic commerce system 119, but accessories for the item are available as products 137 via the electronic commerce system 119. Upon identifying such products 137 in the catalog 133, the third party transaction application can designate these products 137 as complementary products for the purposes of augmenting a listing in an electronic marketplace or for other purposes as described herein.

In one embodiment of the disclosure, a third party seller of an item in an electronic marketplace 121 can, via a client device 106, request that the third party transaction application 125 augment a listing associated with the item with one or more complementary product 139. Accordingly, the third party transaction application 125 can identify the item in the listing as well as complementary products 139 that are available in the catalog 133 that are related to the item. Upon identifying one or more complementary products 139, the third party transaction application 125 can, in one embodiment, augment the listing in the electronic marketplace 121 with user interface elements that allow a potential buyer to purchase the complementary products 139 via the electronic commerce system 119.

In other words, a third party seller can request that the third party transaction application 125 provide user interface elements that are inserted into the listing in the electronic marketplace 121. As one example, a hyperlink can be provided that can be included in the listing, which a potential buyer can follow to view and/or purchase complementary products 139 via the electronic commerce system 119. The third party transaction application 125 can provide a unique link to a particular listing. By providing a unique link, an incentive can be provided to the third party seller and/or a potential buyer, which facilitates providing some kind of compensation to the third party seller and/or potential buyer. As one example, a commission can be paid to the third party seller if a potential buyer follows the provided hyperlink and purchases complementary products 139 via the electronic commerce system 119. As another example, discounted pricing can be provided to a potential buyer for the complementary products 139.

In another embodiment, hypertext markup language (HTML) code can be provided and inserted into the listing in the electronic marketplace 121, which a client 106 on which a potential buyer is accessing the listing can render to facilitate viewing and/or purchasing of the complementary products 139 when the user is viewing the listing. The provided HTML code can include unique hyperlinks or other identifiers that uniquely identify the listing and facilitate tracking of the traffic in the electronic commerce system 119 generated via the HTML code. As noted above, compensation can be provided to a third party seller and/or potential buyer for purchases made as a result of this traffic.

In another embodiment of the disclosure, the third party transaction application 125 can crawl the various listings in an electronic marketplace 121 and identify complementary products 139 associated with the items in the listings. Upon identifying a complementary product for an item in a listing, the third party transaction application 125 can identify the third party seller associated with the listing. The third party transaction application 125 can extract contact information associated with the third party seller from the electronic marketplace 121. For example, an e-mail address, phone number, or other contact information can be extracted from a profile associated with the third party seller in the electronic marketplace 121. The third party transaction application 125 can then transmit to the third party seller an offer to include one or more complementary products 139 in the listing in the electronic marketplace 121. The offer can be transmitted dependent on the type of contact information that can be extracted from the electronic marketplace 121 for the seller. Accordingly, the offer can be transmitted to a client 106*b* executing an email client 145, a client 106*c* executing an SMS client 147, etc. Other variations should be appreciated by a person of ordinary skill in the art.

In another embodiment, the third party transaction application 125 can identify a completed transaction for the sale of an item in the electronic marketplace 121. Upon detecting a sale of an item, the third party transaction application 125 can extract contact information for the third party seller or the buyer associated with the listing as described above. The third party transaction application 125 can then transmit an offer to sell complementary products 139 to the third party seller and/or buyer. The offer can further include an incentive for the third party seller and/or the buyer to incentivize the purchase of the complementary products 139 in the electronic commerce system 119. As a non-limiting example, the third party transaction application 125 can detect a sale of an item associated with a listing in the electronic marketplace 121, extract contact information for the third party seller and the buyer of the item, transmit an offer to the third party seller that includes a commission if the buyer purchases one or more complementary products 139 via the electronic commerce system 119, and transmit an offer to the buyer of the item that includes discounted pricing on the one or more complementary products 139. Other variations of this example should be appreciated by a person of ordinary skill in the art.

Figure 2:
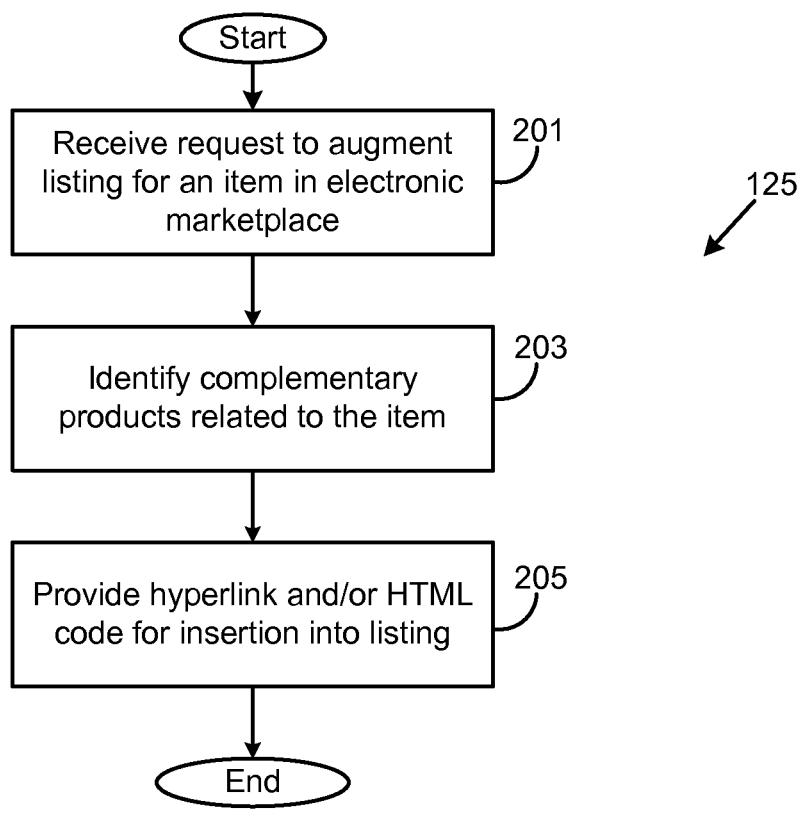
FIG. 2 is a flowchart illustrating one example of functionality implemented as portions of third party transaction application executed in a computing device in the networked environment of FIG. 1 according to various embodiments of the present disclosure.

Referring next to FIG. 2, shown is a flowchart that provides one example of the operation of a portion of the third party transaction application 125 according to various embodiments. It is understood that the flowchart of FIG. 2 provides merely an example of the many different types of functional arrangements that may be employed to implement the operation of the portion of the third party transaction application 125 as described herein. As an alternative, the flowchart of FIG. 2 may be viewed as depicting an example of steps of a method implemented in the computing device 103 (FIG. 1) according to one or more embodiments.

Beginning with box 201, a request to augment a listing in an electronic marketplace 121 (FIG. 1) is received. Such a request can be received from a third party seller on a client device 106 (FIG. 1) in the networked environment 100 (FIG. 1). As noted above, a listing in an electronic marketplace 121 can be augmented with at least one complementary product 139 (FIG. 1) or a product 137 (FIG. 1) that is related to the item in the listing. In box 203, complementary products 139 are identified. As described above, the third party transaction application 125 can determine whether the item in the listing is available as a product 137 in the catalog 133. If the product 137 is available in the catalog 133, the third party transaction application 125 can identify complementary products 139 that are associated with the product 137. As also described above, the third party transaction application 125 can identify products 137 that have a relevance to the item in the listing, and designate these products 137 as complementary. In box 205, the third party transaction application 125 can provide a hyperlink and/or HTML code for insertion into the listing in the electronic marketplace 121.

Figure 3:
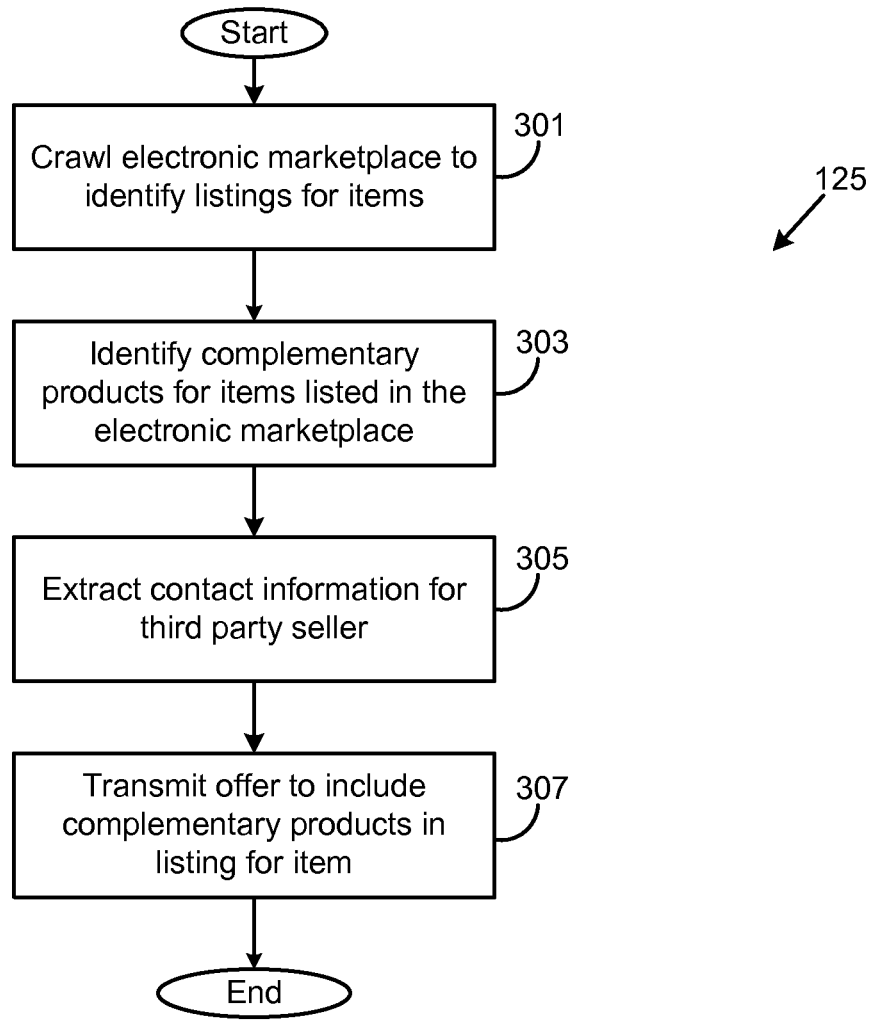
FIG. 3 is a flowchart illustrating one example of functionality implemented as portions of third party transaction application executed in a computing device in the networked environment of FIG. 1 according to various embodiments of the present disclosure.

Referring next to FIG. 3, shown is a flowchart that provides one example of the operation of a portion of the third party transaction application 125 according to various embodiments. It is understood that the flowchart of FIG. 3 provides merely an example of the many different types of functional arrangements that may be employed to implement the operation of the portion of the third party transaction application 125 as described herein. As an alternative, the flowchart of FIG. 3 may be viewed as depicting an example of steps of a method implemented in the computing device 103 (FIG. 1) according to one or more embodiments.

In box 301, the third party transaction application 125 crawls the electronic marketplace 121 (FIG. 1) to identify items for sale by a third party seller. In box 303, the third party transaction application 125 identifies complementary products 139 and/or products 137 related to the items as described above. In box 305, the third party transaction application 125 extracts contact information for the third party seller associated with the item in a listing. In box 307, an offer is transmitted to the third party seller to include the complementary product in the listing. As noted above, the offer can include an incentive for the third party seller and/or a potential buyer.

Figure 4:
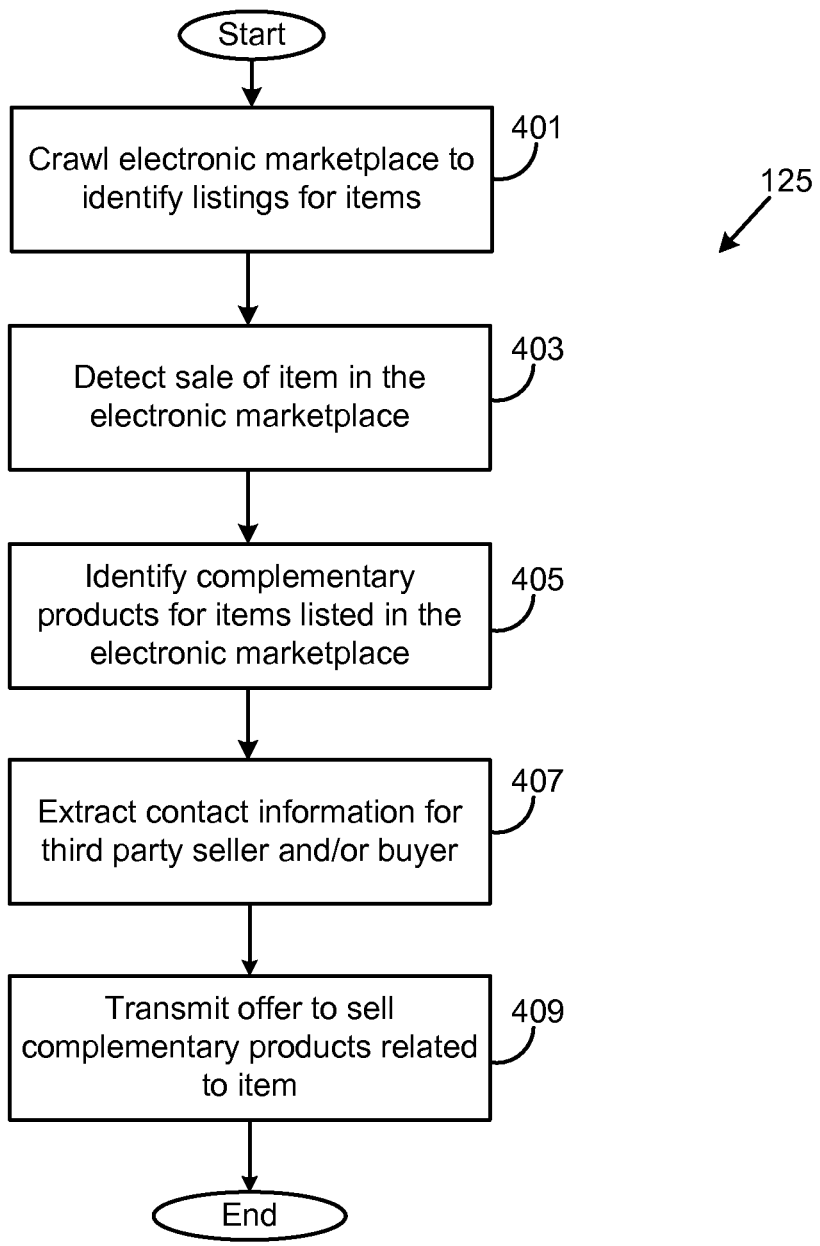
FIG. 4 is a flowchart illustrating one example of functionality implemented as portions of third party transaction application executed in a computing device in the networked environment of FIG. 1 according to various embodiments of the present disclosure.

Referring next to FIG. 4, shown is a flowchart that provides one example of the operation of a portion of the third party transaction application 125 according to various embodiments. It is understood that the flowchart of FIG. 4 provides merely an example of the many different types of functional arrangements that may be employed to implement the operation of the portion of the third party transaction application 125 as described herein. As an alternative, the flowchart of FIG. 4 may be viewed as depicting an example of steps of a method implemented in the computing device 103 (FIG. 1) according to one or more embodiments.

In box 401, the third party transaction application 125 crawls the electronic marketplace 121 (FIG. 1) to identify items for sale by a third party seller. In box 403, a sale of an item associated with a listing is detected by the third party transaction application 125. In box 405, the third party transaction application 125 identifies complementary products 139 and/or products 137 related to the items as described above. In box 407, the third party transaction application 125 extracts contact information for the third party seller and/or buyer associated with the item sold in the listing. In box 409, an offer is transmitted to the third party seller to include the complementary product in the listing and/or to the buyer of the item to purchase the complementary product via the electronic commerce system 119 (FIG. 1). As noted above, the offer can include an incentive for the third party seller and/or potential buyer.

Figure 5:
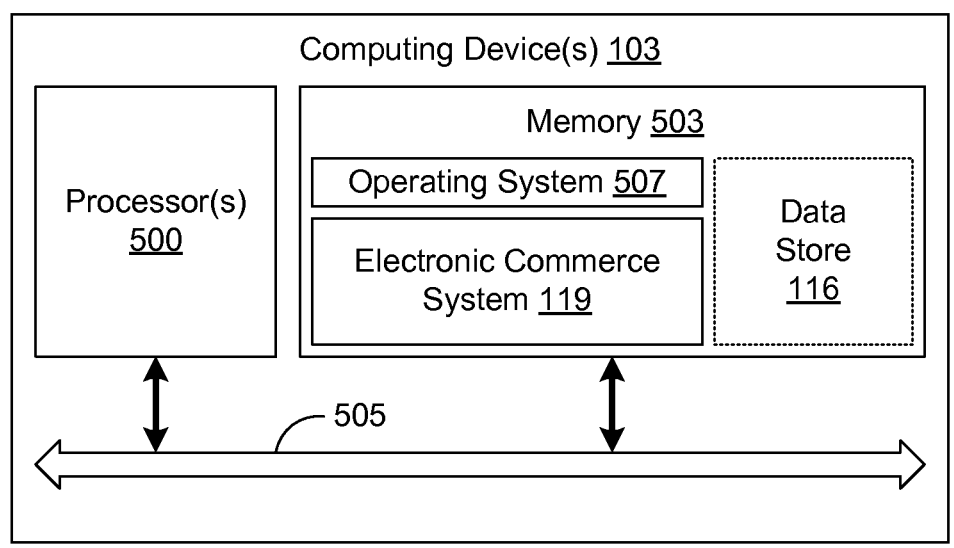
FIG. 5 is a schematic block diagram that provides one example illustration of a computing device employed in the networked environment of FIG. 1 according to various embodiments of the present disclosure.

With reference to FIG. 5, shown is a schematic block diagram of the computing device 103 according to an embodiment of the present disclosure. The computing device 103 includes at least one processor circuit, for example, having a processor 500 and a memory 503, both of which are coupled to a local interface 509. To this end, the computing device 103 may comprise, for example, at least one server computer or like device. The local interface 509 may comprise, for example, a data bus with an accompanying address/control bus or other bus structure as can be appreciated.

Stored in the memory 503 are both data and several components that are executable by the processor 500. In particular, stored in the memory 503 and executable by the processor 500 are electronic commerce system 119, third party transaction application 125, and potentially other applications. Also stored in the memory 503 may be a data store 116 and other data. In addition, an operating system 507 may be stored in the memory 503 and executable by the processor 500.

It is understood that there may be other applications that are stored in the memory 503 and are executable by the processors 500 as can be appreciated. Where any component discussed herein is implemented in the form of software, any one of a number of programming languages may be employed such as, for example, C, C++, C#, Objective C, Java, Java Script, Perl, PHP, Visual Basic, Python, Ruby, Delphi, Flash, or other programming languages.

A number of software components are stored in the memory 503 and are executable by the processor 500. In this respect, the term "executable" means a program file that is in a form that can ultimately be run by the processor 500. Examples of executable programs may be, for example, a compiled program that can be translated into machine code in a format that can be loaded into a random access portion of the memory 503 and run by the processor 500, source code that may be expressed in proper format such as object code that is capable of being loaded into a random access portion of the memory 503 and executed by the processor 500, or source code that may be interpreted by another executable program to generate instructions in a random access portion of the memory 503 to be executed by the processor 500, etc. An executable program may be stored in any portion or component of the memory 503 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 503 is defined herein as including both volatile and nonvolatile memory and data storage components. Volatile components are those that do not retain data values upon loss of power. Nonvolatile components are those that retain data upon loss of power. Thus, the memory 503 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory devices.

Also, the processor 500 may represent multiple processors 500 and the memory 503 may represent multiple memories 503 that operate in parallel processing circuits, respectively. In such a case, the local interface 509 may be an appropriate network 113 (FIG. 1) that facilitates communication between any two of the multiple processors 500, between any processor 500 and any of the memories 503, or between any two of the memories 503, etc. The local interface 509 may comprise additional systems designed to coordinate this communication, including, for example, performing load balancing. The processor 500 may be of electrical or of some other available construction.

Although the electronic commerce system 119, third party transaction application 125, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 2-4 show the functionality and operation of an implementation of portions of the third party transaction application 125. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 500 in a computer system or other system. The machine code may be converted from the source code, etc. If embodied in hardware, each block may represent a circuit or a number of interconnected circuits to implement the specified logical function(s).

Although the flowcharts of FIGS. 2-4 show a specific order of execution, it is understood that the order of execution may differ from that which is depicted. For example, the order of execution of two or more blocks may be scrambled relative to the order shown. Also, two or more blocks shown in succession in FIGS. 2-4 may be executed concurrently or with partial concurrence. Further, in some embodiments, one or more of the blocks shown in FIGS. 2-4 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the electronic commerce system 119 and/or third party transaction application 125, that comprises software or code can be embodied in any non-transitory computer-readable medium for use by or in connection with an instruction execution system such as, for example, a processor 500 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, electronic, magnetic, optical, electromagnetic, infrared, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A system, comprising:
   at least one computing device; and
   a third party application executable in the at least one computing device, wherein the third party application, when executed by one or more processors, causes the at least one computing device to at least:
   crawl a listing for an item available for sale by a third party seller via an electronic marketplace site;
   identify a complementary product listed on a network page by extracting a title associated with the item of the listing on the electronic marketplace site and performing a relevance search across textual data associated with the item that is stored in a catalog associated with the at least one computing device;

generate, in response to identifying the complementary product, a unique hyperlink and hypertext markup language (HTML) code associated with the complementary product on the network page;

transmit, in response to identifying the complementary product, to a client device associated with the third party seller via a network, an offer to sell the complementary product related to the item via the listing on the electronic marketplace site;

receive a request from the client device associated with the third party seller to include the generated hyperlink associated with the complementary product with the listing for the item available for sale via the electronic marketplace site;

augment the listing in the electronic marketplace site to insert the unique hyperlink and the hypertext markup language (HTML) code associated with the complementary product allowing a potential buyer to view and purchase both the item and the complementary product through a user client device browser application; and track an amount of traffic generated through the hypertext markup language (HTML) code associated with the complementary product.

2. The system of claim 1, wherein the third party application further causes the at least one computing device to at least:
determine whether the item is available in the catalog associated with the at least one computing device; and
retrieve the complementary product from a respective product listing in the catalog of the at least one computing device.

3. The system of claim 1, wherein the third party application further causes the at least one computing device to at least:
identify the item in the listing;
determine whether a name of the item is located within metadata associated with a product in the catalog of the at least one computing device; and
identify the product as the complementary product.

4. The system of claim 1, wherein the third party application further causes the at least one computing device to at least:
extract information about the item from the listing;
search the catalog associated with the at least one computing device for a product that is relevant to the information extracted about the item; and
identify the product as the complementary product.

5. The system of claim 4, wherein the third party application further causes the at least one computing device to at least locate at least one accessory product that is compatible with the item.

6. The system of claim 1, wherein the third party application further causes the at least one computing device to at least track whether the complementary product is purchased via the unique hyperlink.

7. The system of claim 6, wherein the third party application further causes the at least one computing device to at least transmit an incentive to at least one of the third party seller or the potential buyer, wherein the incentive is triggered when the complementary product is purchased via the unique hyperlink.

8. The system of claim 1, wherein the third party application further causes the at least one computing device to at least:

detect a sale of the item associated with the listing;
identify a buyer associated with the sale of the item; and
transmit an offer to sell complementary product to a user client device associated with the buyer.

9. A method, comprising:
crawling, by at least one processor in at least one computing device executing a third party application, a listing for an item available for sale by a third party seller via an electronic marketplace site;
identifying, by the at least one processor in the at least one computing device executing the third party application, a complementary product listed on a network page by extracting a title associated with the item of the listing on the electronic marketplace site and performing a relevance search across textual data associated with the item that is stored in a catalog associated with the at least one computing device;
generating, by the at least one processor in the at least one computing device executing the third party application, in response to identifying the complementary product, a unique hyperlink and hypertext markup language (HTML) code associated with the complementary product on the network page;
transmitting, by the at least one processor in the at least one computing device executing the third party application, to a client device associated with the third party seller via a network, an offer to sell the complementary product related to the item via the listing on the electronic marketplace site in response to identifying the complementary product; and
receiving, by the at least one processor in the at least one computing device executing the third party application, a request from the client device associated with the third party seller to include the generated hyperlink associated with the complementary product with the listing for the item available for sale via the electronic marketplace site; and
augmenting, by the at least one processor in the at least one computing device executing the third party application, the listing on the electronic marketplace site to insert the unique hyperlink and the hypertext markup language (HTML) code associated with the complementary product allowing a potential buyer to view and purchase both the item and the complementary product through a user client device browser application; and
tracking, by the at least one processor in the at least one computing device executing the third party application, an amount of traffic generated through the hypertext markup language (HTML) code associated with the complementary product.

10. The method of claim 9, further comprising:
determining, by the at least one processor in the at least one computing device executing the third party application, whether the item is available in the catalog of a data store associated with the at least one computing device; and
retrieving, by the at least one processor in the at least one computing device executing the third party application, the complementary product from a product listing in the catalog of the data store associated with the at least one computing device.

11. The method of claim 9, further comprising:
identifying, by the at least one processor in the at least one computing device executing the third party application, the item in the listing;
determining, by the at least one processor in the at least one computing device executing the third party application, whether a name of the item is located within metadata associated with a product in the catalog of a data store associated with the at least one computing device; and identifying, by the at least one processor in the at least one computing device executing the third party application, the product as the complementary product.

12. The method of claim 9, wherein the identifying of the complementary product further comprises:
   extracting, by the at least one processor in the at least one computing device executing the third party application, information about the item from the listing;
   searching, by the at least one processor in the at least one computing device, the catalog of a data store associated with the at least one computing device for a product that is relevant to the information extracted about the item; and
   identifying, by the at least one processor in the at least one computing device executing the third party application, the product as the complementary product.

13. The method of claim 12, wherein the searching further comprises locating, by the at least one processor in the at least one computing device executing the third party application, at least one accessory product that is compatible with the item.

14. The method of claim 9, further comprising tracking, by the at least one processor in the at least one computing device executing the third party application, whether the complementary product is purchased via the unique hyperlink.

15. The method of claim 14, further comprising generating, by the at least one processor in the at least one computing device executing the third party application, an incentive for at least one of the third party seller or the potential buyer, wherein the incentive is triggered when the complementary product is purchased via the unique hyperlink.

16. The method of claim 9, further comprising:
   detecting, by the at least one processor in the at least one computing device executing the third party application, a sale of the item associated with the listing;
   identifying, by the at least one processor in the at least one computing device executing the third party application, a buyer associated with the sale of the item; and
   transmitting, by the at least one processor in the at least one computing device executing the third party application, an offer to sell the complementary product to a user client device associated with the buyer.

17. A non-transitory computer-readable medium embodying program code, when executed by at least one processor in at least one computing device in a first server system, performs operations comprising:
   crawling a listing for an item available for sale via an electronic marketplace by a third party seller via an electronic marketplace site;
   identifying a complementary product listed on a network page by extracting title associated with the item of the listing on the electronic marketplace site and performing a relevance search across textual data associated with the item that is stored in a catalog associated with the at least one computing device;
   generating, in response to identifying the complementary product, a unique hyperlink and hypertext markup language (HTML) code associated with the complementary product on the network page;
   transmitting, in response to identifying the complementary product, to a client device associated with the third party seller via a network, an offer to sell the complementary product related to the item via the listing on the electronic marketplace site;
   receiving a request from the client device associated with the third party seller to include the generated hyperlink associated with the complementary product with the listing for the item available for sale via the electronic marketplace site;
   augmenting the listing on the electronic marketplace site to insert the unique hyperlink and the hypertext markup language (HTML) code associated with the complementary product allowing a potential buyer to view and purchase both the item and the complementary product through a user client device browser application; and
   tracking an amount of traffic generated through the hypertext markup language (HTML) code associated with the complementary product.

18. The non-transitory computer-readable medium of claim 17, wherein the program code further performs operations comprising:
   detecting a sale of the item associated with the listing;
   identifying a buyer associated with the sale of the item; and
   transmitting an offer to sell the complementary product to a user client device associated with the buyer.

19. The non-transitory computer-readable medium of claim 17, wherein the identifying the complementary product further comprises:
   extracting information about the item from the listing;
   searching a catalog associated with the at least one computing device for a product that is relevant to the information extracted about the item; and
   identifying the product as the complementary product.

20. The non-transitory computer-readable medium of claim 19, wherein the searching further comprises locating at least one accessory product that is compatible with the item.

* * * * *